Jan. 12, 1926.                                    1,569,660
                        T. G. MASSEY
           PIPE PLUG AND METHOD OF REMOVING THE SAME
                Filed March 28, 1922      2 Sheets-Sheet 1

INVENTOR:
Thomas G. Massey
BY
James Whittemore
ATTORNEY.

Jan. 12, 1926. 1,569,660
T. G. MASSEY
PIPE PLUG AND METHOD OF REMOVING THE SAME
Filed March 28, 1922  2 Sheets-Sheet 2

INVENTOR:
Thomas G. Massey
BY
James Whittemore
ATTORNEY.

Patented Jan. 12, 1926.

1,569,660

UNITED STATES PATENT OFFICE.

THOMAS G. MASSEY, OF MONTECITO, CALIFORNIA.

PIPE PLUG AND METHOD OF REMOVING THE SAME.

Application filed March 28, 1922. Serial No. 547,493.

*To all whom it may concern:*

Be it known that THOMAS G. MASSEY, a citizen of the United States, residing at Montecito, in the county of Santa Barbara and State of California, has invented certain new and useful Improvements in Pipe Plugs and Methods of Removing the Same, of which the following is a specification, reference being had therein to the accompanying drawings.

The invention consists in a plug for pipes, and the means for and method of removing the plug from the pipe, especially plugs used in large gas and water mains, all as more fully hereinafter described and as particularly pointed out in the claims.

At the present time, in laying large gas and water mains, it is customary to lay a section, then plug the end and test it out for leaks. To make a plug which will be perfectly tight and which can be applied and readily removed is the object sought in the present invention.

A, represents a pipe end to which the plug B, is applied. The plug may be of any suitable construction to fit the bell mouth of the pipe and permit the usual packing C, of molten metal or cement to be poured around it, and be tamped in the usual manner of making such a joint. For lightness I prefer to make the plug hollow, with lugs D, at suitable points where the pulling connection is to be made, and I prefer to make the plug of cast metal such as cast iron.

Figure 3:
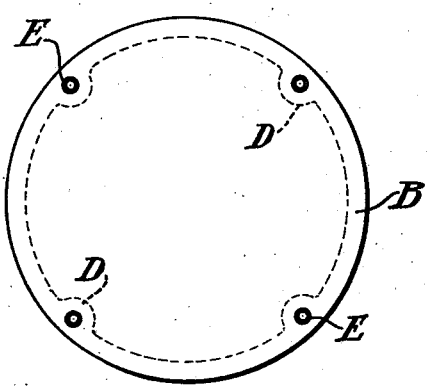
Figure 3 is a plan view of a plug for a large sized pipe where a multiple of cross or abutment beams are employed.

In plugs for smaller pipes, at opposite points I cast in ferrules or nipples E, which are closed at the lower end, open at their outer ends and are interiorly screw threaded. If the pipes are larger, I may place in four or more of these nipples, arranged in pairs at opposite points in the circumference as shown in Fig. 3 where two such pairs are shown.

With the plug thus constructed and firmly secured in the end of the pipe it may be tested, in the usual manner.

Figure 1:
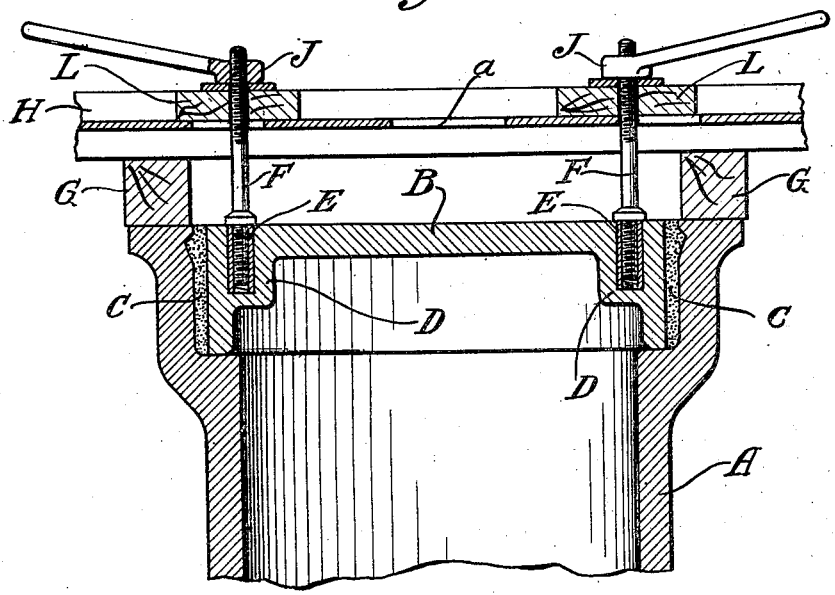
Figure 1 is a vertical, central section through the end of a pipe such as used for gas or water mains, showing the plug in section and the preferred form of means employed for removing the plug.
Figure 2:
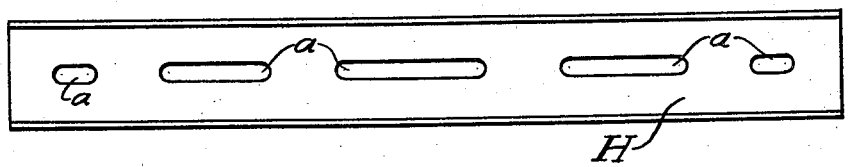
Figure 2 is a plan view of the abutment beam shown in Fig. 1.

When it is desired to remove the plug, the workman screws into the nipples E, the stud bolts F, as shown in Fig. 1, places the blocks G on the end of the pipe outside the plug, and rests on these blocks the cross bar or beam H, the stud bolts passing through suitably spaced apertures or slots *a* in the beam H. This beam may be of any suitable cross section, though I have shown it as an I-beam with the slots *a* through the web.

The workman now applies nuts J to the stud bolts, and by a suitable wrench or handle, turns the nuts, which will cause a lifting action on the plug, the thrust being taken through the cross beam H and blocks G against the end of the pipe. In this way the plug may be quickly loosened and withdrawn.

For convenience in turning the nuts J where an I beam is used for the cross beam I have shown a perforated wooden block placed over each bolt resting on the web of the I beam. These blocks I have lettered L.

Figure 4:
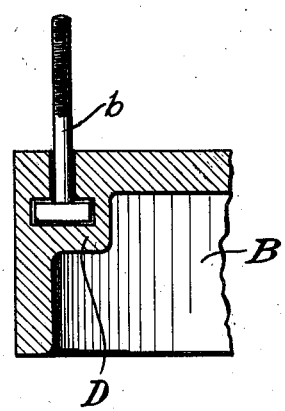
Figure 4 is a section through one edge of a plug, showing a modified form of bolt connection.
Figure 5:
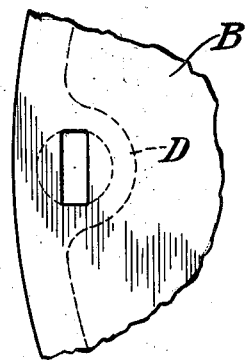
Figure 5, is a plan of the same with bolt removed.

In Figs. 4 and 5 I have shown another manner of connecting the stud bolts to the plug, consisting of a T-slot in the plug, and a T-head stud bolt *b* adapted to detachably engage the T-slot in the well known manner.

Figure 6:
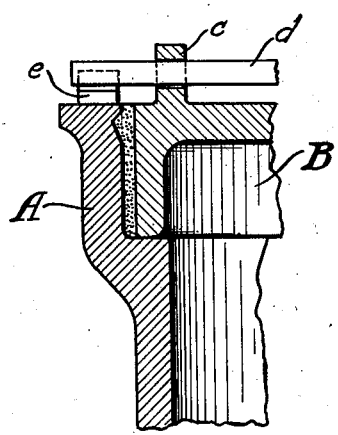
Figures 6 and 7 are detail sections similar to Figure 1, showing modified forms of my invention.
Figure 7:
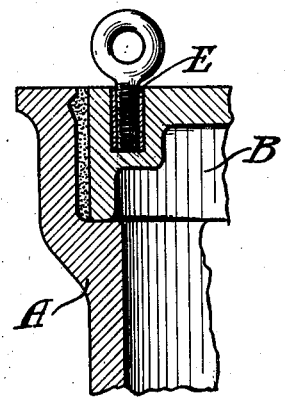

In Fig. 6 I have shown apertured lugs at opposite points of the plug, a cross bar *d* passing through these apertured lugs, and wedges *e* adapted to be driven between the cross bar and the end of the pipe to put the necessary pull on the plug. In Fig. 7 I show an eye bolt through which such a cross bar as *d* may be placed and the wedges employed to pull the plug.

This construction makes a plug which is quickly applied, and which can be easily and quickly removed, in the manner set forth, not only at the ends of sections of main being tested, but also at crosses and T's at street intersections, and at points where future branch mains are to be connected.

What I claim as my invention is:

1. The combination with a pipe end and a stopper in said end, of sealing material between the peripheral face of the stopper and the inner face of the pipe end, a cross bar spanning the pipe and having a bearing thereupon, a pulling member outwardly projecting from the stopper, and means seating upon said cross bar engaging said pulling member for tensioning the same.

2. The combination with a pipe end, a stopper slidably secured therein, a cross bar spanning the pipe end and having bearings thereon at opposite points and free of the stopper, stud bolts connecting into the stopper adjacent its margin and nuts on the bolts engaging the cross bar to withdraw the stopper from the pipe end.

3. The combination with a pipe end of a stopper slidably secured therein, stud bolts for removing the stopper detachably secured to the stopper and projecting outwardly therefrom adjacent the margin of the stopper, a cross bar with which the stud bolts engage, said cross bar having bearings on the pipe end outside the path of the stopper, as and for the purpose described.

4. The combination with a pipe end, a plug slidably secured therein, interiorly threaded nipples secured at opposite points in the plug, stud bolts for removing the plug adapted to be secured in the nipples, a cross bar through which the stud bolts pass, said cross bar having bearings on the pipe end outside the path of the plug, and nuts on the studs engaging the cross bar.

5. The method of withdrawing stoppers slidably secured in pipe ends consisting in attaching a multiple of pulling members to the stopper, placing an abutment between the pulling members and the pipe end outside of the circumference of the stopper, and applying tension to the pulling members by a thrust between the abutment and the pipe end.

6. The combination with a pipe end, of a stopper therein normally having a sealed connection with the pipe end, and means for applying force to said stopper for breaking said seal and withdrawing the stopper, substantially as set forth.

7. The combination with a pipe end, of a stopper therein normally having a sealed connection with the pipe end, and means supported upon the pipe end for exerting force upon said stopper for breaking said seal and withdrawing the stopper, substantially as set forth.

8. The combination with a pipe end, of a stopper therein having its outer wall spaced from the inner wall of the pipe end to receive a sealing material therebetween, a cross bar having a bearing on the pipe end, and means associated with said cross bar for removing said stopper from its sealed connection with the pipe end, substantially as set forth.

9. The combination with a pipe end, of a stopper therein having its outer wall spaced from the inner wall of the pipe end to receive a sealing material therebetween, a cross bar having a bearing on the pipe end, and means carried by said stopper at diametrical points thereof and associated with said cross bar for removing said stopper from its sealed connection with the pipe end, substantially as set forth.

10. The combination with a pipe end, of a stopper therein having its outer wall spaced from the inner wall of the pipe end to receive a sealing material therebetween, a cross bar having bearings on the pipe end at diametrical points thereof, bolts connected at one end to the stopper at diametrical points thereof adjacent the sealing material and having their opposite ends in engagement with said cross bar and means bearing upon the cross bar for placing the bolts under tension to break the seal and remove the stopper, substantially as set forth.

11. The method of withdrawing a stopper sealed within a pipe end comprising attaching a pulling member to the stopper and applying tension to the pulling member and pressure to the pipe end to break the seal and withdraw the stopper, substantially as set forth.

12. The method of withdrawing a stopper sealed within a pipe end comprising attaching pulling members to the stopper at diametrical points thereof adjacent the seal, placing an abutment across the pipe end and applying tension to the pulling members by a thrust on the abutment to break the seal and withdraw the stopper, substantially as set forth.

In testimony whereof I affix my signature.

THOMAS G. MASSEY.